United States Patent [19]

Caswell

[11] 4,222,981
[45] * Sep. 16, 1980

[54] PROCESS FOR PREPARING AGGLOMERATES OF CLAYS

[75] Inventor: Bruce F. Caswell, Whitmore Lake, Mich.

[73] Assignee: Arcanum Corporation, Ann Arbor, Mich.

[*] Notice: The portion of the term of this patent subsequent to Dec. 11, 1996, has been disclaimed.

[21] Appl. No.: 44,515

[22] Filed: Jun. 1, 1979

Related U.S. Application Data

[63] Continuation-in-part of Ser. No. 895,788, Apr. 12, 1978.

[51] Int. Cl.² .............................................. B01J 2/12
[52] U.S. Cl. .................................................. 264/117
[58] Field of Search ......................................... 264/117

[56] References Cited

U.S. PATENT DOCUMENTS

| | | | |
|---|---|---|---|
| 3,268,071 | 8/1966 | Puddington et al. | 204/9 |
| 3,368,004 | 2/1968 | Sirianni | 264/117 |
| 3,471,267 | 10/1969 | Capes | 23/313 |

Primary Examiner—Donald J. Arnold
Assistant Examiner—James R. Hall
Attorney, Agent, or Firm—Blanchard, Flynn, Thiel, Boutell & Tanis

[57] ABSTRACT

An aqueous dispersion of a clay is dewatered and the clay solids thereof are agglomerated using a conditioner and a hydrophobic bridging liquid.

6 Claims, 1 Drawing Figure

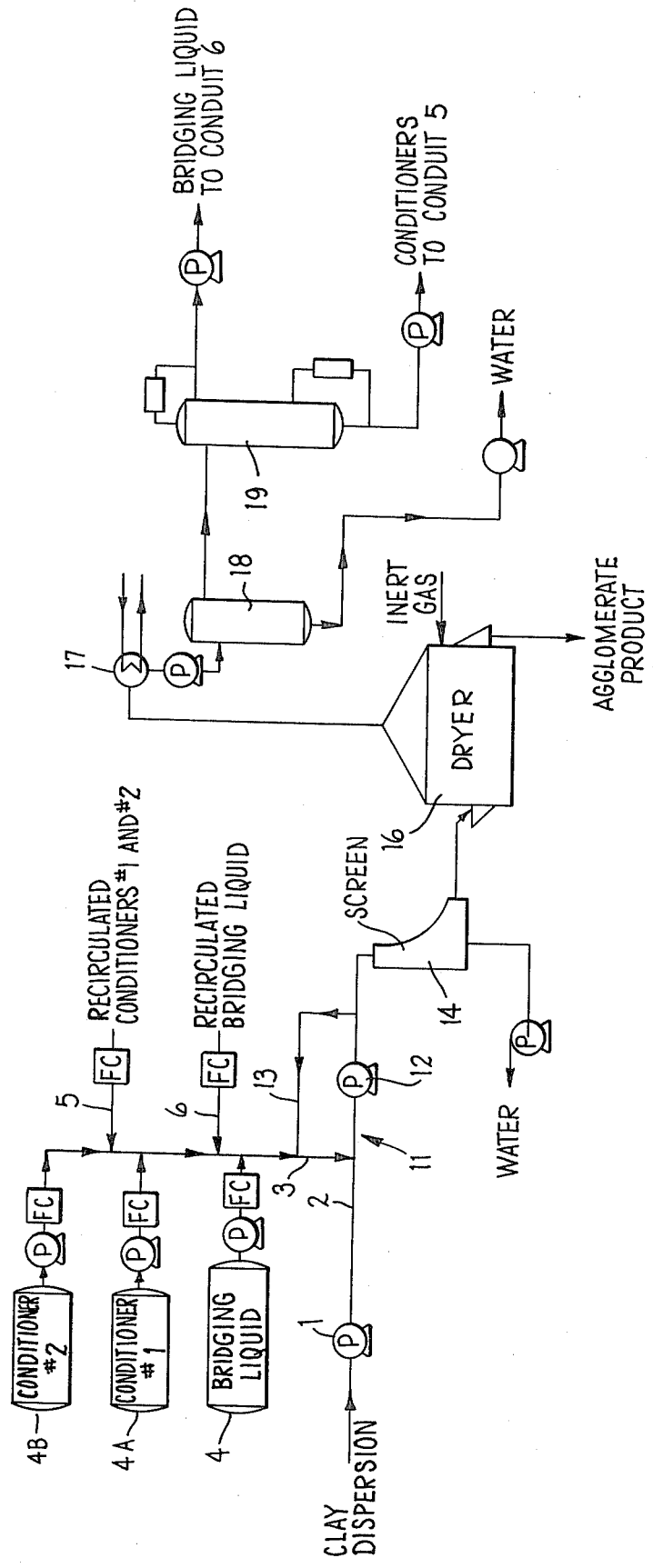

PROCESS FOR PREPARING AGGLOMERATES OF CLAYS

CROSS-REFERENCE TO RELATED APPLICATION

This application is a continuation-in-part of application Ser. No. 895,788, filed Apr. 12, 1978.

BACKGROUND OF THE INVENTION

1. Field of the Invention

This invention relates to a process for dewatering an aqueous dispersion of a clay and transforming the clay solids into pellet form.

Aqueous homogeneous suspensions or colloidal solutions of various kinds of clay minerals can be treated in various ways to reduce the water content thereof, including evaporating the water, filter pressing, flocculating or precipitating the clay solids by the addition of acids or other electro-negatively charged substances, electro-osmosis and centrifugal action. The present invention is related to the flocculation or precipitation process, although it significantly differs therefrom as will be pointed out hereinbelow.

Minerals of the montmorillonite group of clay minerals are so-called expanding 2:1 layer clays. When montmorillonite clays contact water, the water molecules penetrate between the layers of the individual montmorillonite particles. Because of this action and the osmotic swelling that occurs because of double layer repulsion between the layers of individual clay particles, the montmorillonite swells greatly.

The prior procedures for dewatering montmorillonites are generally time-consuming and/or expensive and they do not produce the montmorillonite in the desired form of pellets that are useful for many industrial and commercial applications, such as catalyst carriers, pharmaceutical carriers and absorbents. Additional expensive pelletizing treatments are needed to obtain satisfactory pellets so that the overall expense of obtaining clay pellets is relatively high.

Although a preferred clay material for use in the present invention is montmorillonite or clays which predominantly comprise montmorillonite such as bentonite, in its broader aspects the invention is useful to dewater and pelletize other kinds of clays including illites, kaolinites, chlorites, attapulgites and mixed-layer clays.

It is an object of this invention to provide a process for dewatering aqueous clay dispersions by agglomerating the clay solids and then pelletizing the clay agglomerates so as to obtain clay pellets of relatively large size which are useful for a variety of industrial and commercial purposes.

It is a further object of the invention to provide a process, as aforesaid, which is inexpensive and simple to perform, and which can be performed using conventional, readily available equipment.

The broad process of forming an agglomerated product, such as a pellet or a ball, from a liquid suspension of solid material or materials in a finely divided form has long been known and certain specific processes utilizing the basic concept are set forth in a variety of United States and other patents. Examples of these patents are those to Puddington and Farnand U.S. Pat. No. 3,268,071, Sirianni and Puddington U.S. Pat. No. 3,368,004 and Capes et al U.S. Pat. No. 3,471,267. Briefly, all three of these patents refer to a procedure wherein the powders are suspended in a first liquid which is lyophobic to said powders, a second or bridging liquid is then added thereto which second liquid is chosen or treated so as to be lyophilic to at least certain of said powders and the system is then agitated. This forms the solid material which is lyophilic to the bridging liquid into a plurality of agglomerates whose size and shape depend on the details of said procedure as same are set forth at length in said patents and to which reference is invited. These procedures may be and are used both for the separation of one of a mixture of solids from such mixture and such is the main purpose of the above-mentioned Puddington U.S. Pat. No. 3,268,071, or they may be and are used where the formation of an agglomerated product is the objective itself of the agglomeration procedure and such is the principal purpose of the other two patents above-named.

The invention provides a process for dewatering aqueous dispersions of clays, particularly montmorillonite, and forming agglomerates of the clay particles contained in such dispersions, which comprises the steps of:

a. adding to the aqueous clay dispersion, (i) hydrophobic organic liquid which is immiscible with water and (ii) liquid conditioner effective to penetrate the clay particles and to displace the interlayer and surface water so that the surfaces of the clay particles become oleophilic, whereby the clay particles are no longer wetted by water but rather are preferentially wetted by the organic liquid and there is formed a two-phase liquid system in which said clay particles are contained essentially only in the organic liquid phase, and the water phase is essentially free of clay particles, b. agitating the two-phase liquid system to effect repeated collisions of said particles and thereby forming in said system a dispersion in water of agglomerates, said agglomerates consisting essentially of said solid clay particles coated with said hydrophobic organic liquid and having said conditioner adsorbed therein and wherein said agglomerates may contain some water trapped in the interstitial spaces thereof, c. discontinuing said agitation and separating said agglomerates from the freely drainable water contained in the dispersion obtained in step (b), d. then drying said agglomerates and removing as much as possible of said hydrophobic liquid, said conditioning agent and trapped water therefrom whereby to obtain substantially dry agglomerates, and e. then recovering the agglomerates.

Inasmuch as the present invention can make use of wellknown equipment, the details of suitable equipment are not disclosed herein. Reference may be made to the three patents noted above, particularly U.S. Pat. Nos. 3,368,004 and 3,471,267, for further details concerning useful equipment and details of agglomeration procedures.

BRIEF DESCRIPTION OF THE DRAWING

The drawing is a schematic flow diagram of the process of the invention.

The starting aqueous clay dispersion treated by the process of the present invention is a pumpable aqueous homogeneous dispersion or colloidal solution. Such a dispersion can be obtained by dispersing mined clay in water. Such a clay dispersion can also be produced as a by-product of the various ore beneficiation processes. The clay dispersion usually contains from about one to about 10 percent by weight, typically about 5 percent by weight, of clay solids having a particle size of minus 150 mesh and the balance thereof is essentially water. However, the solid content of the clay dispersion is not critical and clay dispersions containing greater or lesser concentrations of solids can be used in the invention.

The aqueous clay dispersion is pumped by a pump 1 through a conduit 2. A stream of a mixture of treating liquids which preferentially wet the solid particles of the dispersion is flowed through conduit 3 and is combined with the dispersion in the conduit 2. During startup of the process, the treating liquids are fed from the tanks 4, 4A and 4B into the conduit 3, by means of pumps and flow controllers (FC) as shown. During steady-state operation, most of the mixture of treating liquids is recycled treating liquid supplied from conduits 5 and 6 and "make-up" treating liquid is supplied from tanks 4, 4A and 4B as needed.

The mixture of treating liquids is comprised of (1) a bridging liquid which is immiscible with water and displaces the water from the surfaces of the suspended clay solids and (2) one or more conditioners, two conditioners in this instance, which change the wetting properties of the clay solids of the dispersion by being selectively adsorbed on the surfaces of the solid clay particles to alter their normal surface properties, whereby the bridging liquid can displace the water from the surfaces of the solid particles.

Useful bridging liquids include hydrophobic organic liquids such as liquid hydrocarbons including fuel oil and kerosene, chlorinated hydrocarbons such as perchloroethylene, and trichloroethane, and the like. The hydrophobic organic liquids are referred to as bridging liquids in view of their function of creating bridges between the solid clay particles whereby to form agglomerates. Conditioners are polar organic substances which are adsorbed on the clay particles at the solid-liquid interface. The conditioner will usually have a balanced hydrophilic-hydrophobic molecular structure and it is adsorbed on the solid with the hydrophobic (hydrocarbon) portion oriented outwardly so that the clay particles will be wetted by the bridging liquid. The polar groups of the conditioners are adsorbed on the clay particles. The conditioner molecules penetrate between the layers of the clay particles and displace the interlayer water. The clay surface becomes covered with polar molecules containing a substantial proportion of hydrocarbon groups so that the surface becomes oleophilic whereby the clay particles become wetted by the oil phase and the water phase becomes essentially free of clay particles. Organic acids such as tall oil, xanthates, alcohols and long chain aliphatic amines, particularly primary amines $RNH_2$ wherein R is alkyl having 4 to 18 carbon atoms, all having a large hydrocarbon nucleus, are useful as conditioners, according to the invention.

In the illustrated embodiment, fuel oil is employed as the bridging liquid. The conditioner is comprised of approximately equal amounts of tall oil and octylamine. The amounts of bridging liquid and conditioner are selected so that good quality, reasonably dense agglomerates are obtained in the following agglomeration step. The amounts can be determined by routine experimentation on the particular suspension of clay being treated. U.S. Pat. No. 3,368,004 describes the criteria for selecting the proportions and reference can be made thereto for additional description concerning this. Typically, the amount of conditioner (total of tall oil and octylamine in the disclosed embodiment) is from about 0.1 to 10% by weight and the amount of bridging liquid is from about 6 to 20% by weight, both percentages being based on the weight of the clay solids in the clay dispersion.

The streams of the aqueous clay dispersion and the mixture of conditioners and bridging liquid are combined in conduit 2. The flow rates of the various liquid streams are controlled by flow controllers (FC) in a conventional way. The combined stream is agitated in an agglomeration mechanism 11 whereby to form agglomerates of the clay solids present in the starting clay dispersion. The agitating and agglomerating mechanism 11 can be selected from among the equipment known to be useful for this purpose including reciprocal shakers, rotating drums, pump loops (shown in the drawing), tanks with propeller-type agitators and in-line mixers. The particular equipment used will depend on the desired properties of the agglomerates, i.e. density. Shakers will be used when agglomerates of high density and strength are wanted. However, for most purposes, the agglomerates formed in the agglomeration mechanism 11 need not possess high density and strength. Under these circumstances a pump loop is a highly effective agitating and agglomerating apparatus and is preferred because of its ease of operation.

In the illustrated apparatus, the agglomeration mechanism is a pump loop comprised of a centrifugal pump 12 and a feedback conduit 13 for returning a selected portion of the discharge of the pump to the inlet thereof. If desired, a flow controller (not shown) can be provided in the feedback conduit 13 for adjusting the flow rate of the recycle stream and thereby controlling the average residence time of the combined stream in the pump loop. During the time they are present in the pump loop, the finely divided solid clay particles in the clay dispersion are formed into compact agglomerates wherein the finely divided particles are held together owing to the formation of liquid bridges between the particles caused by the presence of the bridging liquid. The bridging liquid is insoluble in and is immiscible with the aqueous liquid phase and it preferentially wets the finely divided particles by displacing the aqueous phase whereby to cause the particles to bond together. The agglomerate product discharged from the pump loop 11 is a slurry or suspension of agglomerates in an aqueous liquid phase. The agglomerates themselves consist essentially of the clay particles, the conditioners and the bridging liquid, wherein the conditioners are adsorbed on the clay particles and the bridging liquid is present as bridges between the particles. Some water usually is trapped in interstitial spaces in the agglomerates. The particle size of the agglomerates is such that they can be readily separated from the freely drainable aqueous liquid phase. Usually the agglomerates have a particle size of from about 1/32 to ⅛ inch, although larger size and smaller size agglomerates can be formed if desired by adjusting the average residence time in the agglomeration mechanism 11.

The agglomerates are then separated from the freely drainable aqueous phase. In the illustrated embodiment, the slurry discharged from the pump loop 11 is fed onto a screen 14 wherein the freely drainable water passes through the screen. Other apparatuses that can be used for this purpose are filters, settling vessels and centrifuges. The agglomerates, removed as the overflow, are then fed to a dryer 16 wherein they are heated to a temperature effective to vaporize therefrom almost all of the water remaining therein, plus the conditioners and bridging liquid. For example, the dryer can be heated at a temperature of about 350° F. It is preferred to perform the drying under an inert gas atmosphere, such as $CO_2$.

The vapors from the dryer 16 are condensed in a condenser 17 and the condensate is fed to a separation tank 18 wherein the aqueous phase is separated from the organic phase. The organic phase is then distilled in a distillation tower 19, the fuel oil is recovered as the distillate and the conditioning agents are recovered as the still bottoms. The fuel oil is recycled to conduit 6 and the conditioners are recycled to conduit 5.

The substantially dry agglomerates discharged from the dryer 16 may still contain minor amounts of water, usually less than about 1 wt. %, as bound water. The agglomerates are essentially free of conditioner and bridging liquid. These agglomerates are the final product of the process. As indicated above, the agglomerates generally have a particle size in the range of about 1/32 to ⅛ inch and they are freely flowable solids.

EXAMPLE

An aqueous clay dispersion, containing about 5 percent by weight of montmorillonite solids having a particle size of minus 150 mesh is fed at a rate of about 5500 pounds per minute (PPM), equal to about 645 gallons per minute (GPM), through conduit 2. A mixture of about 15.7% by weight of octylamine, about 15.7% by weight of tall oil and 66.6% by weight of fuel oil is flowed into the conduit 2 at a rate of about 66 PPM (9.5 GPM). The two streams are combined in conduit 2 and are fed to a pump loop 11 having a volumetric capacity of 655 GPM, whereby to provide an average residence time of the combined streams in the pump loop of about one minute. The discharge (slurry) of the pump loop is fed onto a screen 14 and 10 mesh size and 606 GPM of water and fine particles are removed as the underflow. The overflow (about 573 PPM, 40% water) is fed into a dryer 16 operating at 350° F., whereby about 27.1 GPM of water and about 9.5 GPM of organic phase are removed as vapor. The solid agglomerates from dryer 16 comprise about 99 percent by weight of montmorillonite solids. There is recovered about 280 pounds per minute of solid agglomerates having a particle size of about 1/16 to about ⅛ inch. The vapors are condensed in the condenser 17 and the organic phase is separated from the aqueous phase in the separator 18. The organic phase is a mixture of the bridging liquid and conditioners. It is distilled and the bridging liquid and the conditioners are separately recycled to the beginning of the process.

Although a particular preferred embodiment of the invention has been disclosed in detail for illustrative purposes, it will be recognized that variations or modifications of the disclosed process lie within the scope of the present invention.

The embodiments of the invention in which an exclusive property or privilege is claimed are defined as follows:

1. A process for dewatering an aqueous clay dispersion and forming pellets of the clay particles, which comprises the steps of:
   (a) adding to the aqueous clay dispersion (i) hydrophobic organic bridging liquid which is immiscible with water and (ii) liquid conditioner which is effective to displace water from the clay particles and to render the surfaces of the clay particles oleophilic, whereby to form a two-phase liquid system wherein the clay particles are dispersed in and wetted by said hydrophobic organic bridging liquid as one liquid phase and the other liquid phase is water which is essentially free of clay particles;
   (b) agitating the two-phase liquid system to effect repeated collisions of the clay particles and thereby forming in said system a slurry of agglomerates in the water phase wherein said agglomerates consist essentially of the clay particles having said liquid conditioner adsorbed thereon and bound together by said hydrophobic organic bridging liquid;
   (c) discontinuing said agitating and separating said agglomerates from the water;
   (d) then drying said agglomerates to remove essentially all of said bridging liquid and said liquid conditioner therefrom; and
   (e) then recovering said agglomerates.

2. A process according to claim 1 in which said first separating step (c) is performed by draining water from said agglomerates.

3. A process according to claim 1 wherein the amount of said hydrophobic organic bridging liquid is from 6 to 20 percent by weight and the amount of said liquid conditioner is from 0.1 to 10 percent by weight, both percentages being based on the weight of the clay solids in said dispersion.

4. A process according to claim 3 in which said aqueous clay dispersion contains from about one to about 10 percent by weight of clay solids having a particle size of minus 150 mesh.

5. A process according to claim 1 in which said hydrophobic organic bridging liquid is selected from the group consisting of fuel oil, kerosene, perchloroethylene and trichloroethane, and said liquid conditioner is selected from the group consisting of tall oil, xanthates, alcohols, long chain aliphatic amines and mixtures thereof.

6. A process according to claim 1 in which said hydrophobic organic bridging liquid is fuel oil and said conditioner is selected from the group consisting of tall oil, octylamine and mixture thereof.

* * * * *